United States Patent

Vaughan

[15] 3,665,691
[45] May 30, 1972

[54] EDGING ATTACHMENT FOR ROTARY LAWN MOWERS

[72] Inventor: Allan H. Vaughan, 2 Larchmont Drive, Huntington, W. Va. 25705

[22] Filed: Feb. 5, 1971

[21] Appl. No.: 113,011

[52] U.S. Cl. ........................................................56/255
[51] Int. Cl. ....................................................A01d 55/18
[58] Field of Search ..................56/255, 256, 320.1, 320.2, 56/17.5, 17.4, 12.2

[56] References Cited

UNITED STATES PATENTS

| | | | |
|---|---|---|---|
| 1,313,866 | 8/1919 | Sopousek | 56/249 |
| 2,132,465 | 10/1938 | Gast | 56/255 |
| 2,531,081 | 11/1950 | Shippey | 56/12.2 |
| 2,826,889 | 3/1958 | Menge | 56/256 X |
| 3,524,307 | 8/1970 | Dahl | 56/17.4 |

Primary Examiner—Russell R. Kinsey

[57] ABSTRACT

This invention consists of a horizontally disposed cylindrical wire brush that is located in an elongated U-shaped opening in a supporting plate which is suitably secured at an angle on the front end of a rotary lawn mower. The aforesaid wire brush is supported by a shaft whose ends project into two bearings mounted on the just-mentioned supporting plate. One end of the aforesaid shaft is provided with a gear, which is in mesh with a second gear that is secured to the outer end of a wheel supporting shaft which is also mounted on the supporting plate of this invention.

5 Claims, 2 Drawing Figures

INVENTOR
ALLAN H. VAUGHAN

Patented May 30, 1972

INVENTOR
ALLAN H. VAUGHAN

EDGING ATTACHMENT FOR ROTARY LAWN MOWERS

This invention relates to lawn mowers; more particularly, to rotary lawn mowers; still more particularly, to an attachment adapted to condition the grass along the edge of a concrete walk or the like so that the grass can easily be trimmed by the lawn mower.

For the benefit of those having limited knowledge of the terminology of lawn mowers, the rotary lawn mower is a lawn mower having horizontally disposed cutting blades that are rotated by an electric or gasoline motor located on top of the mower which is sometimes pushed and always guided by a handle located on the rear end of the machine. Some of the larger types of lawn mowers provide a seat for the operator of the lawn mower.

It is the principal object of this invention to provide an edging attachment for rotary lawn mowers that will pick up overgrown grass, weeds, etc. from the finished surface thus making it possible for the rotary lawn mower to cut all of the growth to a uniform height along all finished edges.

Another object of this invention is to provide an edging attachment for rotary lawn mowers that can be secured to any existing lawn mower without one having to modify the mower.

Another object of this invention is to provide an edging attachment for rotary lawn mowers that contains a minimum number of parts which can be replaced, if broken, by the use of ordinary mechanic's tools that are normally found in nearly any tool box.

Still another object of this invention is to provide an edging attachment for rotary lawn mowers that has its horizontally disposed cylindrical wire pickup brush rotated by a wheel that rolls along the concrete walk or the like against the grass edge of which this invention operates.

The above objects, together with other objects and advantages of this invention, will become subsequently apparent in a study of the details of the construction of this invention on examination of the accompanying drawings and the reading of the appended claims.

In the two views of this invention, like parts of the same are indicated by like reference numbers, the reference number 5 indicating the entire invention.

Figure 1:
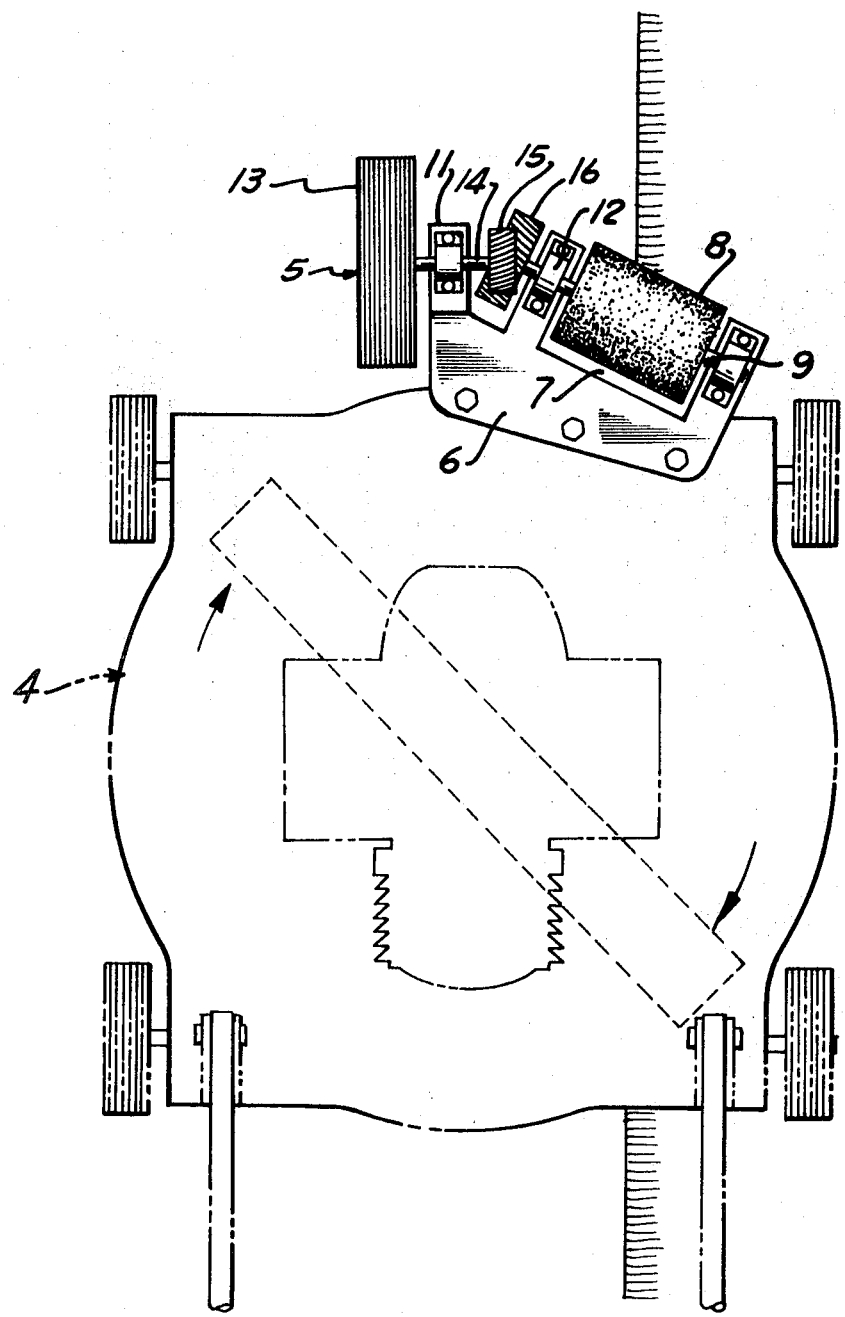
FIG. 1 is a top view of a typical rotary lawn mower having this invention secured thereto. Only the invention is shown in solid black lines.
Figure 2:
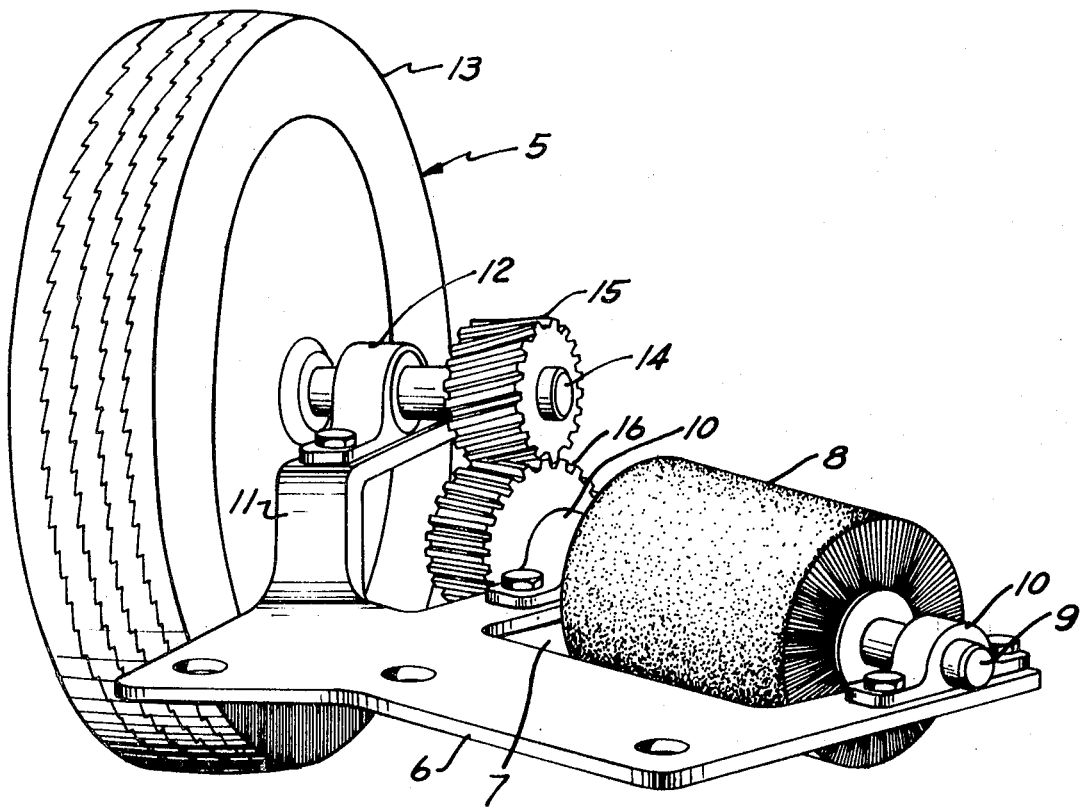
FIG. 2 is a pictorial view of this invention in its entirety.

Looking first at FIG. 1 of the accompanying drawing it will be seen that this novel invention 5 is suitably secured to the front end of a typical rotary lawn mower 4. The invention consists of a supporting plate 6 having an elongated U-shaped opening 7 in which is located the horizontally disposed cylindrical wire brush 8. The just-mentioned wire brush 8 is supported by a centrally located shaft 9 having its two ends project out beyond the ends of the brush in order to pass through the supporting bearing blocks 10 that are suitably secured to the top of the supporting plate 6. One end of the aforesaid supporting plate 6 has an integrally formed upwardly extending L-shaped wheel support bracket 11 on which is mounted a third bearing block 12. The wheel 13 has an axle 14 which passes through the bearing block 12 to terminate in the center of the gear 15. Gear 15 is in mesh on top of the gear 16 that is secured to one end of the previously mentioned shaft 9 of the cylindrical wire brush 8, thereby providing a means of rotating the brush as the wheel 13 rolls along the concrete walk or any other surface on which the lawn mower is being used.

The detailed construction of this invention has just been described in detail. The method of operation is so obvious from examination of the accompanying drawings that no explanation is considered necessary other than to remark that the rotary action of the aforesaid cylindrical wire brush will no doubt have a certain amount of cutting effect on the grass over which it passes and will therefore in many cases actually do the edge cutting of the lawn or the like along a walk or whatever surface over which the lawn mower is being run.

This invention is subject to any and all changes in detail design and/or modifications that one may care to make in the same in so long as the changes and/or modifications fall within the scope and intent of the appended claims.

What I now claim as new is:

1. An edging attachment for rotary lawn mowers, comprising rotary grass conditioning mechanism, supporting structure for the mechanism of the said edging attachment, the said structure being secured to the front end of a rotary lawn mower, the said mechanism adapted to be disposed on said mower at an acute angle relative to the longitudinal axis thereof and being adapted to pick up overgrown grass, weeds, and other loose material from the finished surface over which the said lawn mower is passing, thereby making it possible for the said lawn mower to cut all of the growth to the same uniform height along the edge of a walk or the like.

2. The invention of claim 1, wherein the said supporting structure is a horizontally disposed plate having an elongated U-shaped opening therein for a portion of the said mechanism.

3. The invention of claim 2, wherein the said mechanism consists in part of a horizontally disposed cylindrical wire brush that is located in the elongated U-shaped opening in the said horizontally disposed plate; and means of rotating the said brush as the said lawn mower moves along the ground.

4. The invention of claim 3, wherein a supporting shaft extends clear through the said cylindrical wire brush, thereby supporting the said wire brush, the said shaft having one end passing through a bearing block that is located on the said plate, and the other end of the said same shaft extending out beyond the other end of the said cylindrical wire brush and passing through a like bearing block that is also located on the said plate, the last-mentioned end of the said shaft being provided with mechanism adapted to rotate the said cylindrical wire brush.

5. The invention of claim 4, wherein the last-mentioned mechanism consists of a gear secured to the end of the said shaft, and a second gear secured to the end of a shaft that passes through both a third bearing block and a wheel that rolls along the ground when the said lawn mower is in motion, thereby rotating the said cylindrical wire brush.

* * * * *